United States Patent
Cohen

[15] 3,667,138
[45] June 6, 1972

[54] SPEECH TRAINING APPARATUS AND METHOD OF TEACHING THEREWITH

[72] Inventor: Ronald S. Cohen, Milwaukee, Wis.
[73] Assignee: Behavioral Controls, Inc., Milwaukee, Wis.
[22] Filed: June 29, 1970
[21] Appl. No.: 50,747

[52] U.S. Cl. ................................................35/35 C
[51] Int. Cl. ..............................................G09b 5/04
[58] Field of Search ..................35/1, 35 R, 35 A, 35 C; 84/464; 179/1 VS, 1 VC

[56] References Cited

UNITED STATES PATENTS

| | | | |
|---|---|---|---|
| 2,212,431 | 8/1940 | Bly | 35/1 |
| 1,654,068 | 12/1927 | Blattner | 84/464 |
| 2,416,353 | 2/1947 | Shipman et al. | 35/1 |
| 2,421,146 | 5/1947 | Goldberg | 35/1 |

*Primary Examiner*—Wm. H. Grieb
*Attorney*—Andrus, Sceales, Starke & Sawall

[57] ABSTRACT

A housing has an upper dome illuminated by a lamp. A pair of permanent magnet cone speakers are mounted in the opposite sidewalls of the housing and connected in series across the input to a preamplifier. An amplifier connects the sound related output signal to the input of a power transistor connected in series with the lamp to a regulated DC supply. The speakers, housing and amplifier establish a response range from 250 to 4,000 Hertz to reject voiceless sounds. A potentiometer connects the supply directly to the input of the power transistor for preheating of the lamp and controlling the response. A delay switch connects and disconnects a resistor in the base circuit of the transistor to vary the timing and cutoff of the lamp.

14 Claims, 5 Drawing Figures

PATENTED JUN 6 1972

3,667,138

INVENTOR.
Ronald S. Cohen

BY
Andrus, Sceales, Starke & Sawall

Attorneys

3,667,138

SPEECH TRAINING APPARATUS AND METHOD OF TEACHING THEREWITH

BACKGROUND OF INVENTION

The present invention is particularly directed to a speech training apparatus and to the method of using such apparatus and, in particular, to the teaching of speech training to those who have a speech disorder or particularly a hearing disorder such as partial or severe deafness.

Children and adults with speech and hearing disorders as well as those who are mentally retarded have substantial difficulty in overcoming the handicap because of limitation in the ability to communicate. In connection with deafness and similar disorders, they do not have the usual audible feedback system which will automatically give them an indication of the particular result being attempted. Normally, the instructor must try to explain the various characteristics of sound and the lack thereof to the student which, in itself, presents substantial difficulties. For example, the student may have a tendency to speak too softly or at an intensity level which is too high. A person with normal hearing may control such aspects of his voice through the automatic audio feedback provided by his hearing sense. Breath control presents another very difficult concept to develop by a deaf person and is very essential in order to properly interconnect sentences and clauses of any given length such as employed in normal speech. Further, the distinction between voiced and voiceless sounds is extremely difficult to convey and explain because the lip motion may be essentially the same. The distinction arises not in the lips but in the fact that the voiced sounds are made with the vocal cords and associated equipment while the voiceless sounds are merely the result of forcing air through the teeth and lips.

Thus, the teaching of speech to those with hearing and speech disorders has presented very substantial problems. Certain teaching aids have been suggested such as that disclosed in U.S. Pat. No. 2,421,146 which relies essentially on the teacher as the feedback medium. In U.S. Pat. No. 2,416,353, a sophisticated system is disclosed which presents an oscilloscope record of the voice pattern and assumes a reasonably high level of attention and skill by the student. Such devices have not found practical application apparently because of the complicated presentation which is of minor assistance in teaching of persons, particularly young persons, with hearing and other similar speech disorders.

Applicant realized that a suitable apparatus would require a very simple and attention-establishing output which would be of continued interest to a young or retarded person and yet would permit proper control by an instructor to relate the output to the person's speaking characteristic and particularly breath control, voice level control and distinguishing between voiced and voiceless sounds.

SUMMARY OF PRESENT INVENTION

Generally, in accordance with the present invention, a light means in the form of a lamp or the like is energized in accordance with the several selected characteristics of the speech sound and in a manner to provide a reliable and versatile speech training aid which can add a highly effective dimension to the multiple sensory training techniques employed with persons having hearing or speech disorders, retarded persons, and the like. Generally, in accordance with the present invention, a light means is coupled to a sound pickup means by an amplifying and control means to permit accurate control and adjustment of the output to reflect and display the speech pattern presented to the pickup means as modulated light with the intensity related to the sound amplitude characteristic. The use of an illumination means such as a lamp or the like is particularly desirable in connection with deaf or retarded persons as the changing light patterns rapidly attract their attention and does not require a great amount of skill or concentration to detect, respond and change the light display.

In accordance with a particularly important aspect of the present invention, the apparatus is constructed to distinguish between voiced and voiceless sounds and is based on the realization that the two types of sounds have very distinct frequency ranges when such sounds are made in isolation. In particular, the device is designed to respond to the voiced sounds, the frequency components of which are predominately within the range of 250 to 4,000 Hertz. In accordance with a particularly novel aspect of the present invention, the frequency response range was conveniently established by proper selection of the cone-type permanent magnet receivers housed within a suitable enclosure. In addition, a sensitivity control can be adjusted such that the light will burn brightly for the voiced sounds and essentially not at all for voiceless sounds.

The sensitivity control not only permits adjustment of the light means to accurately distinguish between the voiced and voiceless sounds but also permits means for adjusting the device to indicate directly to the student the difference between the loudness and softness of his voice. The light means thus replaces the auditory monitoring or feedback of a person with normal hearing with a very engaging and responsive direct visual display.

In accordance with a further aspect of the present invention, a delay switching means is provided to selectively vary the response of the circuit for purposes of training breath control. Thus, when it is desired to teach saying of short sentences or phrases in a single breath, a delayed mode is connected and the student is instructed to maintain the light on during the phrase. Abnormal speaking delays, e.g., to take a breath, will result in turning off of the light. The normal pauses between words, however, will not affect the light illumination because of the slow decay of the lamp in the delay mode.

In accordance with a further aspect of the present invention, a background control is provided to conjointly control with the sensitivity control the response to background noise level. A particularly novel background control employs a preheating of the lamp by energization of the lamp to just below the illuminating visual display level. This greatly increases life of a normal incandescent bulb and also permits adjustment for the background noises within the room.

In accordance with a preferred construction and a particularly novel construction of the present invention, a lamp is mounted to the upper portion of a housing with a pair of receivers, one each on the diametrically opposite sides of the unit. The housing is mounted between the student and the instructor, with the respective speakers facing the student and the instructor respectively. This provides optimum location of the input devices while maintaining proper output to indicate to both the student and the instructor the results of their speaking.

The present invention thus provides a relatively simple and reliable apparatus for converting speech sounds to add a versatile and highly effective light dimension to multiple sensory training techniques and one which is particularly adapted for the hard-of-hearing, deaf and people with speech disorders such as Parkinson's patients. The apparatus can also be applied to rehabilitate patients who have had strokes, lost their vocal control and the like. The device is also useful in teaching deaf people who are also essentially blind but can perceive light. By adjusting the apparatus to flash brightly in response to speech sound, feedback can be provided to some deaf-blind people.

BRIEF DESCRIPTION OF DRAWING

The drawing furnished herewith illustrates the mode presently contemplated for carrying out the present invention in which the above advantages and features are clearly disclosed as well as others which will be readily understood from the following description.

In the drawing.

DESCRIPTION OF ILLUSTRATED EMBODIMENT

Figure 1:
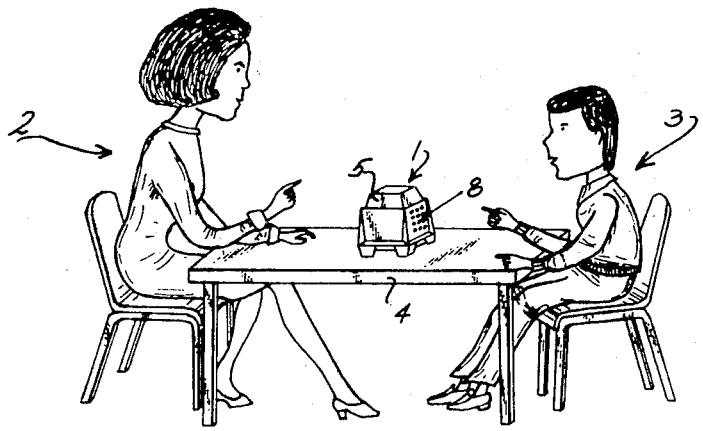
FIG. 1 is a side elevational view showing the teaching aid of the present invention associated with a student and a teacher.

Referring to the drawing and particularly to FIG. 1, a voice-to-light conversion apparatus 1 constructed in accordance with the present invention is illustrated located between a teacher 2 and a student 3. The apparatus 1 is a relatively small unit which may be conveniently located on a table 4 between which the teacher and student are located on suitable seating means. The voice-to-light conversion apparatus 1 of the illustrated embodiment of the invention includes an upper or top translucent lighted dome 5 secured to and supported by a lower housing 6. A first receiver 7 is located within the housing 6 facing the teacher 2. A similar receiver 8 is located to the opposite side facing the student 3. A lamp 9 is mounted immediately beneath the dome 5 and coupled to a power supply through an electronic level control responsive to the output of the receivers 7 and 8. Either the student or instructor may speak into the apparatus 1 and, as hereinafter described, control the illumination of the translucent dome 5 to provide a direct light response of the input.

The portion of the apparatus facing the teacher is provided with a bank of controls including a sensitivity control means 10 which may also incorporate an on-off switch means. In addition, a background control means 11 is provided and a delay responsive control means 12 is provided on the housing facing the teacher. The sensitivity control means 10 is shown as a rotating input dial which allows the teacher to control the basic sensitivity of the unit to sound input. The background control is shown as a rotating input which provides for a preheating of the illumination means within the translucent dome 5 and thereby the sound level required to turn the lamp 9 on and off or to change the light level. In cooperation with the sensitivity control means 10, the instructor may adjust the system to respond only to the individual and joint inputs essentially from the student and instructor. The delayed time response control means 12 is shown as a two-way switch which controls the coupling of the lamp 9 to the voice signals from the receivers 7 and 8 so as to selectively maintain illumination for a minimum period after termination of the sound.

The apparatus 1 provides a means for converting sound to light patterns which will produce a changing light display of the loudness and the duration of the sound. The device has been specifically adapted for a speech training said for people who are wholly or partially deaf. Thus, by speaking into the associated speaker 8, the student 3 controls the on and off illumination as well as the duration and level of illumination. This provides an attention-attracting output while permitting accurate light variation as a visual response similar to the normal audible response or feedback in the normal hearing system.

In accordance with a particularly important and novel aspect of the present invention, the apparatus is constructed to discriminate between voiced and voiceless sounds such as the voiced sounds g, d, z, b and v and the related voiceless sounds k, t, s, p and f, when they are presented in isolation. The apparatus is in accordance with this aspect of the invention constructed such that the full response is within a frequency range of approximately 250 to 4,000 Hertz. The device will respond to voiced sounds but will cancel and reject most voiceless sounds. The latter are generally of a much higher frequency and will, therefore, not properly operate the amplifier to energize the light. The voiced sounds are, however, well within the operating range. As most clearly shown in Fig. 3, the housing 6 is generally a multiple-part assembly having a rectangular box-like power portion formed of a suitably vacuum-formed extruded plastic. Coils 13 and 14 are a part of permanent magnet cone speaker units suitably attached within the lower portion of the housing 6. The top of the housing 6 is closed by the dome 5 which may be formed as an inverted cup-shaped square member of a frosted plastic. The plastic enclosure or housing 6, as hereinafter described, conjointly with the receivers 13 and 14 as well as the electronic amplifying means shown in FIG. 4, limit and determine the response of the apparatus to sound-related signals which fall within the range of essentially 250 to 4,000 Hertz and hereby establish means to distinguish between voiced and voiceless sounds for the student and the instructor.

Figure 5:
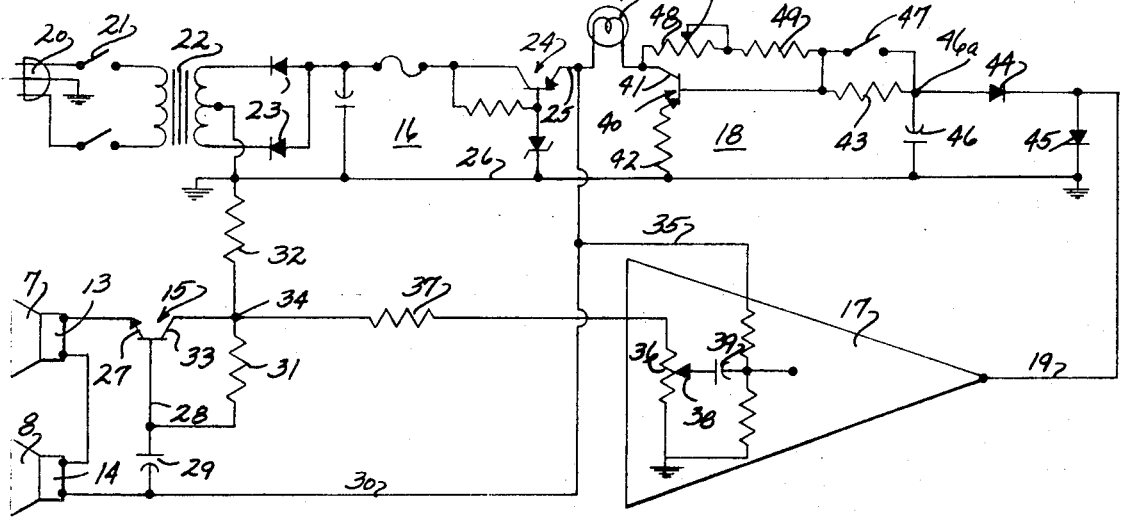
Fig. 5 is a schematic circuit diagram illustrating a preferred and novel construction of the present invention.

More particularly, as shown in Fig. 5, the electronic control system employs coils 13 and 14 of the receivers 7 and 8 connected in series with each other across the input to a preamplifying transistor 15 to control the conduction of the transistor. A regulated power supply 16 is interconnected to energize the lamp 9, transistor 15, transistor 40 and amplifier 17. A lamp driver stage 18 is interconnected to the output line 19 of the amplifier 17 to control the energizing of incandescent lamp 9 located beneath the dome 5 or other illumination means. A change in input to either one of the receivers 7 or 8 results in a variation in the input circuit to the transistor 15 and corresponding variation in the output signal. The output signal is amplified by amplifier 17 and controls the lamp driver stage 18 to correspondingly vary the illumination of lamp 9.

More particularly, the regulated power supply includes an alternating current input unit or plug 20 adapted to be inserted into the usual grounded wall receptacle. A power switch 21 interconnects the output of the input plug to a voltage stepdown transformer 22 which is adapted to reduce the usual 120 volt input to a suitable lower voltage such as 24 volts. A pair of rectifying diodes 23 are connected to the opposite ends of the transformer to provide a direct current input to a series-regulating NPN transistor 24 which establishes a regulated direct current between a pair of DC output lines 25 and 26 connected respectively between the transistor 24 and a center tap of the transformer 22. In an actual construction, a 24 volt transformer 22 was employed with a series regulator interconnected to establish a —9 volts at the emitter of the regulating transistor 24 and line 25 with respect to the common line 26. The —9 volts was interconnected to control the energization of the lamp 9, the operation of the receivers 7 and 8, the output amplifier 17 and the like as follows.

The preamplifying transistor 15 is shown as an NPN transistor connected in a known common base configuration. The transistor's emitter 27 is connected to one side of the series-connected receiver coils 13 and 14. The opposite side of the series-connected receiver coils 13 and 14 is connected to the base 28 of transistor 15 in series with a capacitor 29. The receivers 7 and 8 are similar devices which vary the input current in response to incoming sound. A particularly satisfactory result has been obtained with a Jensen speaker, model 35K7, which is manufactured and sold by the Muter Company of Chicago, Illinois. The receiver supplies an output current which varies with the sound level. A return power line 30 interconnects the junction between the capacitor 29 and the connection to the receiver coil 14 directly to the negative side or line 25 of the regulated power supply. A pair of voltage-dividing resistors 31 and 32 are connected in series between the base and the common line 26 of the power supply. The junction of the series-connected resistors 31 and 32 is connected to the collector 33 of the transistor 15 as at 34.

The capacitor 29 is thus charged with the base 28 of the transistor 15 being held positive relative to the emitter 27 with the AC voltage across the input circuit and the capacitor being dependent upon the output signal of the receiver coils 13 and 14. Thus, the conductivity of the transistor 15 is directly related to the dynamic output voltage of the receivers. Thus, in turn, varies the voltage at the collector which, in turn, is connected as the input to the amplifier 17. As previously described, the receivers 7 and 8 with the associated housing 6 and amplifier are selected to essentially transmit sound-related signals only in the range of 250 to 4,000 cycles per second or Hertz. The amplifier may be any suitable sensitive amplifier which will respond to the output level of the transistor and the frequency response range. Thus, applicant has found an Amperax PCA–4–9 amplifier provided a satisfactory amplification of the sound-related signal.

In the illustrated embodiment of the invention, a power supply line 35 interconnects the negative side of the regulated power supply to the amplifier 17. A sensitivity control potentiometer 36 coupled to means 10 is connected in series with a coupling resistor 37 to the collector 34 of the transistor 17. The sensitivity potentiometer 36 includes a tap 38 which is connected through a suitable capacitor 39 to an input amplifying stage of the amplifier 17, not shown. In the illustrated embodiment of the invention, the tap 38 is ganged to the on-off switch 21 and thus interconnected to the control means 10 shown as a rotatable knob. The instructor turns the knob 10 to close the power switch 21 and adjusts the potentiometer tap 38 to vary the proportionate input to the amplifier for any given change in the input signal. The output of the amplifier 17 is essentially proportional to the converted sound signal and appears at output line 19 with the output level related to the setting of the potentiometer tap 38. The output line 19 of the amplifier 17 is connected as a control input to the driver stage 18 to thereby control the energization level of the lamp 9.

The illustrated lamp 9 is a suitable incandescent bulb adapted to be operated from a 9 volt source. One side of the lamp 9 is connected directly to the negative side or line 25 of the regulated power supply and the opposite side of the lamp 9 is connected to the return line 26 in series with a driving transistor 40. The driving transistor 40 is shown as a PNP type power transistor having its collector 41 connected to the lamp 9 and its emitter connected to the common line 26 in series with an emitter-resistor 42. The transistor 40 is connected to receive a direct current sound-related signal through a base resistor 43 in series with a diode 44 connected between the transistor's base and the output line 19 of the amplifier 17. Timing and smoothing capacitor 46 is connected from point 46a to the common line 26. The output line 19 is also connected by a voltage-clamping diode 45 directly to the common line 26. Diode 44, diode 45 and capacitor 46 serve as a known voltage doubling rectifier circuit to transform AC signals from output line 19 into a DC driving potential. Conductivity of the driving transistor 40 is therefore dependent upon relative negative potential which appears across capacitor 46. This, in turn, is directly proportional to the sound level input. Thus, as the sound level increases, the negative potential across capacitor 46 increases, with a corresponding increase in conductivity of the driving transistor 40. This creates a corresponding increase in the illumination of the lamp 9. The response level and time is, of course, directly dependent upon the impedance in the network.

Capacitor 46 charges to a level related to the negative voltage of the voltage doubling rectifier circuit. When the sound level decreases, the capacitor will tend to discharge maintaining the transistor 41 on and maintaining the illumination level of the lamp 9. The discharge time will be related to the value of the emitter-resistor 42 and, more important, the base resistor 43 which is normally of a resistance many times greater than that of the emitter-resistor 42. For example, the emitter-resistor may be of the order of one-half ohm while the base resistor will be of the order of 220 ohms. The input signal is essentially applied directly to the base of transistor 40 to provide a rapid response in connection with a change in the input sound level. In accordance with the present invention, a mode control switch 47 is connected in parallel with the base resistor 43. The switch 47 is coupled to the delay response control means 12 to selectively bypass the base resistor 43 and thereby change the time constant in the delay circuit. Thus, if the switch 47 is closed, the base resistor 43 is bypassed and the capacitor 46 rapidly discharges and the illumination level of the lamp 9 rapidly responds to the input signal. In the normal position, the light 9 will turn on with the sound and will then rapidly turn off when the sound stops.

With the switch 47 open and in the delay position, the light 9 will turn on immediately in response to a change in the incoming sound level. When sound-related signals terminate, however, the capacitor 46 must discharge through resistor 43 and have a correspondingly greater time constant. This maintains the bias on the transistor 17 to maintain lamp 9 on for a short period after the sound stops.

The delay function of this invention is particularly useful for breath control exercises and for teaching the speaking of short sentences and/or phrases in a single breath.

In addition, in the illustrated embodiment of the invention, a background potentiometer 48 is connected in series with a fixed resistor 49 directly across the base-to-collector circuit of the transistor 40. This provides a direct and second input to the base separate from the resistor 43 and capacitor signal input to maintain a predetermined minimum turn signal to the transistor 40. As a result, a minimum current flow through lamp 9 in the absence of energization from a sound signal is produced. The potentiometer 48 includes a movable tap 50 coupled to the background control means 10 which includes a control knob. Turning of the knob clockwise will reduce the resistance inserted into the circuit and increase the conductivity setting of the transistor 40. In operation, the instructor adjusts the lamp 9 to establish a steady glow and then slightly increases the resistance to just turn off the lamp 9. In the event of abnormal room noises or the like, the background potentiometer setting is reduced to minimize the preheating of the lamp. Simultaneously, the sensitivity potentiometer 36 is adjusted to effectively pick up only sounds immediately presented adjacent to the speakers or receivers 7 and 8 of the training device.

Where the device is so adjusted to eliminate background sound, the delay switch 47 will normally be placed in the normal mode in order to establish an immediate light pattern related to the voice sounds. Although it may be necessary to exaggerate points of stress in order to illustrate the difference in brightness with the volume changes, the student will rapidly adapt to the illumination changes and thus minimize the period of stressing.

Figures 2, 3, 4:
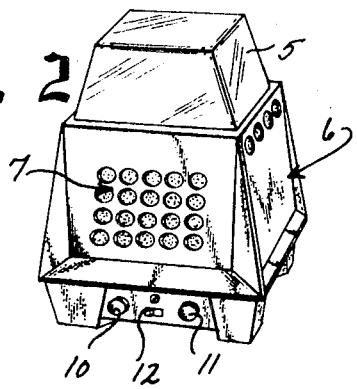
FIG. 2 is an enlarged pictorial view of the teaching aid shown in FIG. 1.
FIG. 3 is a side elevational view with parts broken away to show details of construction.
FIG. 4 is a side elevational view from a side adjacent Fig. 3 to more clearly illustrate the construction.

As previously noted, the illustrated embodiment of the invention establishes the particular response characteristic which may depend, in part, on the construction of the housing 6. A practical construction is shown in FIGS. 2–4 wherein the housing 6 includes a cup-shaped bottom support 51, a tubular central wall 52 secured to the support 51 and closed by dome 5. A generally cup-shaped metal bracket 53 is bolted or otherwise secured within the support 51 with upstanding side walls which extend upwardly into the central wall 52. An inverted U-shaped perforated metal wall 54 is secured to the side walls of bracket 53 and with the top wall generally in the plane of the lower end of the dome 5 which rests on the top periphery of the wall 54. The central wall 52 telescopes downwardly over the metal wall 54 and includes a top flange 55 which clamps against the flange 56 of the dome 5.

The receivers 7 and 8 are secured to the side walls of wall 54 and the corresponding portions of housing wall 52 is perforated, as shown in FIGS. 1 and 2. The socket 57 for lamp 9 is mounted on the top of wall 54 with the electrical connection to the power supply and electronic components which are mounted with the housing 6.

A housing 6 of the above construction with the following general dimension was employed with the previously described speakers or receivers to produce the desired frequency response. The unit had an overall height of 9 inches, with support 51 1¼ inches, the dome 5 2⅛ inches, and the wall 52 5⅝ inches. The unit was essentially 6¾ inches square at the lower end of wall 52 and 5 inches square at the upper end of wall 52. Although the above provides one particular construction which has been satisfactorily applied, it is given for illustration purposes only and is not considered limiting the teaching of the invention which may employ any other suitable housing construction.

The operation and application of the illustrated teaching aid is briefly summarized in connection with the various applications to which the device is conveniently applied in connection with the teaching of persons having speech or hearing defects.

The apparatus is located between the student and the instructor, as shown in FIG. 1, with the on-off control knob of the sensitivity control means turned to the "on" position to supply power to the system. The sensitivity control means is adjusted to set the response to the sound and in combination with the background control means, and is established to essentially respond to the local sounds and, furthermore, to produce a dim light for soft sounds and a substantially brighter light for louder sounds. Under normal conditions, the delay switch 47 is set to the normal position.

To initiate operation and response to the unit, the student must first be taught to realize the connection between the light and his vocal efforts. Thus, the teacher may produce different kinds of sounds while the student views the lamp 9 in order to encourage imitation by the student. Once the student realizes there is a connection between his vocal attempts and the light, the application of the device will assist the student in the rapid development of normalized speech. The characteristic of the turning on and off of the lamp 9 with vocalized sounds is particularly significant in connection with teaching of young or small children as the on-off lighting or dancing characteristic provides a reinforcement and incentive for the continuing production of the sound.

After teaching the association of the light with the vocal output of the person, a volume control of the voice level can readily be instituted. If the student tends to speak too softly, the sensitivity control means is adjusted to a relatively low level, such that only higher voice levels will cause illumination of the lamp 9. By talking with the student and bringing to his attention that any time his voice level drops to a whisper or below, lamp 9 will not light, the student can be caused to understand that the light is illuminated only in response to normal voiced sounds. He can then readily correct himself without interruption by the teacher. This permits the student to develop a natural reaction or feel with the voice mechanisms to an acceptable voice volume for normal speech.

For the same reason, an inadequate auditory monitor may cause a child to speak at a low level or others to speak at a high level. An opposite control can be readily instituted by setting the sensitivity high and instructing the child to keep the light off or dimly lit whenever he speaks.

Thus, by instructing the student to first control the volume to a higher or lower level, the apparatus can be subsequently set to a normal level and then, particularly through the use of single syllable sounds and varying levels of loudness, the varying illumination level about a normal sound level can be taught and indicated.

In order to provide a normal speech pattern, the student must learn to present a short sentence or phrase in a single breath. This is provided for in the present invention by the special normal delay control means. With the control means in the delay mode of an operation, the response of the unit is varied such as to permit normal interruption or pauses between words but indicates an abnormal delay resulting from a pause sufficiently long to actually take a breath. In this mode, the student is instructed to maintain the light illuminated when speaking and, in particular, to establish a continuous illumination for each short sentence or phrase. Abnormal delays in his speaking caused by pausing to take a breath within such sentence or phrase results in deenergization and turn-off of lamp 9. However, normal pauses between words in the given short sentence or phrase will not interrupt the illumination of the lamp as a result of the slow decay of the lamp in the delay mode.

Breath control exercises can also be instituted by having the child repeat a series of sounds such as one *a* with instructions to maintain the light on as long as possible. Continued practice will lengthen the time in which the light is held on as the student learns to release his breath slowly and evenly.

In order to achieve proper pronunciation, the student must learn to produce and differentiate between sounds whose lip motions may be essentially the same. The distinction arises not in the lips but in the fact that the voiced sounds (e.g., *d*, *g*, *z*, *b* and *v*) are made with the vocal cords and associated equipment, while their associated voiceless sounds (e.g., *t*, *k*, *s*, *p* and *f*) are produced by merely forcing air through the teeth and lips. An immediate visual feedback mechanism which differentiates these two types of sound is provided for in the present invention by constructing its components such that the full response is within a frequency range of approximately 250 to 4,000 Hertz. The device will respond to voiced sounds as they are generally within this operating range. The device will not respond to voiceless sounds as these are generally of a much higher frequency and will, therefore, not properly operate the amplifier to energize the light.

Through imitation, the student may form the proper lip and mouth configuration for a particular sound and then receive immediate feedback as he tries to produce the voiced sound or its voiceless counterpart. Once the student realizes the light will turn on only for voiced sounds and not for voiceless, he may work on these types of sounds with the unit, unaided by the teacher.

The present invention thus provides a relatively simple and versatile apparatus for assisting an instructor and a student in overcoming various hearing and speech defects.

I claim:

1. A speech training apparatus comprising illumination means to establish a visual illumination of a varying intensity, a sound receiver means mounted to intercept voice sound and establish related signals and connected to said illumination means to vary the illumination intensity in accordance with speech sound intensity, and response control means coupled to the receiver means and illumination means to operatively transmit signals having a frequency essentially only in the range of 250 to 4,000 Hertz and thereby to discriminate between voiced sounds and voiceless sounds in the energization of said illumination means.

2. The speech training apparatus of claim 1 having an adjustable timing means coupled to said illumination means to selectively maintain operation of the illumination means for a selected period after termination of a sound related control signal.

3. The speech training apparatus of claim 2, wherein said adjustable timing means includes a two-position switch to selectively connect a timing capacitor in circuit to selectively maintain operation of the illumination means for a selected period after termination of a sound-related control signal.

4. The speech training apparatus of claim 1 having a background sound control means connected to said illumination means to adjust the response and limit response to sounds generated immediately adjacent said receiver means.

5. The speech training apparatus of claim 1 wherein said receiver means includes a plurality of individual receivers located in spaced relation for individually responding to an instructor and to a student.

6. The speech training apparatus of claim 1 including a housing having a light transmitting upper wall, said receiver means includes a pair of permanent magnet receivers mounted within said housing to the opposite sides thereof to sense sounds from the opposite sides and cooperating with said housing to define said response control means.

7. The speech training apparatus of claim 6 wherein said response control means includes an amplifying means coupled to said receiver means to establish a sound-related control signal proportional to the level of the speech sounds and connected to said illumination means to vary the illumination intensity in accordance with speech sound level.

8. The speech training apparatus of claim 1 including a housing having a light transmitting upper wall, said receiver means includes a pair of permanent magnet receivers mounted within said housing to the opposite sides thereof to sense sounds from the opposite sides, said illumination means including a lamp mounted beneath said upper wall to transmit the light to both sides of said housing.

9. The speech training apparatus of claim 1 wherein said illumination means is an incandescent lamp, said receiver means are low impedance permanent magnet receivers, said amplifying means includes a matching impedance preamplifier and a high impedance output amplifier to establish said sound-related control signal as a direct current voltage proportional to the level of the speech sounds.

10. The speech training apparatus of claim 1 having a regulated power supply means, and wherein said receiver means includes a pair of series-connected permanent magnet receivers and a sensing preamplifier transistor having input means connected across the receivers in series with the regulated power supply means, said illumination means including a lamp and an illumination control transistor having output means connected in series with the lamp to the regulated power supply means, an amplifier, a sensitivity control potentiometer connecting said amplifier to said sensing preamplifier transistor to amplify said sound-related control signal resistor means connecting said amplifier to said illumination control transistor to vary the conductivity of said illumination control transistor, a timing capacitor connected across said resistor means and said illumination control transistor, a switch means connected across said resistor means, and a background response control potentiometer connected between the power supply and the control transistor to establish a predetermined continuous heating of said lamp in the absence of a sound-related control signal.

11. A speech training apparatus having visual display means to indicate visually the sound-related signals, and receiving means for receiving spoken sound and connected to said visual display means, said receiving means including means to reject voiceless sounds resulting from the forcing of air through the teeth and lips and to respond to voiced sounds resulting from the operation of the vocal cords of the speaker for corresponding operation of said display means only in response to the voiced sounds.

12. A speech training apparatus comprising illumination means to establish a visual illumination of a varying intensity, receiver means located to receive the speech sounds, amplifying means coupled to said receiver means to establish a sound-related control signal proportional to the level of the speech sounds and connected to said illumination means to vary the illumination intensity in accordance with speech sound level, and an adjustable timing means coupled to said illumination means to selectively maintain operation of the illumination means for a selected period after termination of a sound-related control signal.

13. A speech training apparatus comprising illumination means to establish a visual illumination of a varying intensity, receiver means located to receive the speech sounds, amplifying means coupled to said receiver means to establish a sound-related control signal proportional to the level of the speech sounds and connected to said illumination means to vary the illumination intensity in accordance with speech sound level, a first adjustable control means to set the sensitivity of the amplifying means to the sound, and a second adjustable means connected to the illumination means to establish a minimal energization of the illumination means below a visual illumination level and thereby the response of the apparatus to the sound.

14. The speech training apparatus of claim 13 wherein said second adjustable means includes a bias network connected to the amplifying means to bias said amplifying means to conduct and energize the illuminating means.

* * * * *

UNITED STATES PATENT OFFICE
CERTIFICATE OF CORRECTION

Patent No. 3,667,138                    Dated June 6, 1972

Inventor(s)    RONALD S. COHEN

It is certified that error appears in the above-identified patent and that said Letters Patent are hereby corrected as shown below:

Column 3, Line 53, after "training" cancel "said" and insert --- aid ---;

Column 3, Line 73, after "box-like" cancel "power" and insert --- lower ---.

Signed and sealed this 5th day of December 1972.

(SEAL)
Attest:

EDWARD M. FLETCHER, JR.         ROBERT GOTTSCHALK
Attesting Officer                Commissioner of Patents